UNITED STATES PATENT OFFICE.

CARLETON ELLIS, OF MONTCLAIR, NEW JERSEY.

PROCESS OF HYDROGENATING ORGANIC MATERIALS AND OF PRODUCING AMMONIA.

1,201,226.     Specification of Letters Patent.     Patented Oct. 10, 1916.

No Drawing.     Application filed July 1, 1914. Serial No. 848,354.

*To all whom it may concern:*

Be it known that I, CARLETON ELLIS, a citizen of the United States, and a resident of Montclair, in the county of Essex and State of New Jersey, have invented certain new and useful Improvements in Processes of Hydrogenating Organic Materials and of Producing Ammonia, of which the following is a specification.

This invention relates to catalyzers and to catalytic processes of hydrogenation including the hardening of oils and the union of hydrogen with nitrogen to form ammonia, and relates particularly to the use of catalysts of a character adapted to perform the operation of hydrogen addition with relative ease, and embraces duplex or composite catalysts including certain compounds of nickel and boron and the like, as set forth hereinafter.

In the union of hydrogen and nitrogen by catalytic action great pressures have heretofore been used to make a single catalyst containing simply traces of other bodies as activators, work effectively. By the present invention it becomes possible to work with pressures of less magnitude.

An illustrative form of procedure under my invention is as follows:—Boron hydrid or similar or equivalent hydrid, in any suitable degree of hydridation is used as a precipitant for nickel or other similar or equivalent metal, it being desirable in this instance to have present an element absorptive of hydrogen, e. g. the nickel, and a second element absorptive of nitrogen, e. g. the boron, these elements or bodies being so intimately in contact that occlusion of hydrogen and nitrogen take place side by side and the synthesis of ammonia is effected.

The hydrid or hydrids of boron may be passed into an alkali such as caustic potash solution to form a borid of potassium or similar compound and this reagent used to precipitate nickel from a solution in which it exists as a salt. A borid of nickel which forms is collected and preferably dried away from contact with air. The finely-divided precipitate contains nickel and boron in such a condition that their occlusive properties are highly developed. Using this material for the production of ammonia, the mixed gases, hydrogen and nitrogen, in equivalent proportions for example, are passed over a layer, or through a bed, of the catalytic, under conditions such that the boron is not formed into a volatile hydrid to any undesirable extent and thus carried away from the main mass of catalytic material. The ammonia forming by this reaction is suitably absorbed or otherwise collected.

The various methods employed for this are of course well known in the art. The temperature employed for the reaction except for the lower limits imposed as indicated above, may run up to that determined by dissociation of the formed ammonia, although the action of nickel at too high a temperature as an occluding agent is somewhat impaired, and temperatures adapted for suitable absorption of hydrogen are desirable so far as conformable with the relatively high temperature of nitrogen absorption by boron. In a similar manner other metallic bodies may be formed to afford a duplex catalyst. Nitrogen obtained as a by-product from the Solvay process of soda manufacture may be used in conjunction with a suitable supply of hydrogen, as from coke ovens. The hardening of oils such as glycerids and fatty acids should of course take place at temperatures at which no undue decomposition of the fatty material occurs. A proportion of two equivalents of nickel to one of boron may be used for the aforesaid procedure.

While I have described a particular mode of preparing the catalyzer, I do not desire to limit myself to this particular mode, but however prepared, the catalyst will contain, in intimate contact, a hydrogen-occluding element, such as nickel, in intimate association (for example chemically combined) with a nitrogen-occluding agent, such as boron. Various equivalents may be employed, in place of the nickel, and in place of the boron specified in the specific example above given.

What I claim is:—

1. The process of hydrogenating material which comprises bringing the material into contact with hydrogen in the presence of a catalyst comprising a chemical compound of nickel and a compatible non-metallic solid element capable of forming a hydrid.

2. The process of hydrogenating material which comprises bringing such material into contact with a duplex catalyst, in the presence of hydrogen, said catalyst containing both a hydrogen-occluding metal and a nitrogen occluding non-metallic solid element in a state of a chemical combination.

3. The process of producing ammonia which comprises bringing nitrogen and hydrogen into contact with a catalyzer comprising nickel combined with a compatible non-metallic material comprising a solid element capable of forming a hydrid, at least a part of said nickel and solid element being chemically combined with each other.

4. The process of hydrogenating material which comprises bringing such material into contact with a hydrogen-containing gas and a catalyzer comprising nickel combined with non-metallic material comprising a solid element capable of forming a hydrid, at least a part of said nickel and solid element being chemically combined with each other.

5. The process of hydrogenating material which comprises bringing said material with hydrogen into contact with a catalyzer comprising a compound containing nickel and boron.

6. The process of adding hydrogen to nitrogen to form ammonia which comprises bringing these gases into contact with nickel borid.

7. A process as described which comprises the treatment of hydrogen and a material capable of being caused to combine therewith, with a catalyst comprising boron and nickel, in a state of chemical combination.

8. A process of affixing hydrogen to substances which comprises reacting upon a substance to which hydrogen is to be affixed, with hydrogen in the presence of a catalyst comprising a metal capable of acting as a hydrogenating catalyst chemically combined with a solid element capable of readily uniting with nitrogen.

9. A process of affixing hydrogen to substances which comprises reacting upon a substance to which hydrogen is to be affixed, with a hydrogen-containing gas in the presence of a catalyst comprising a metal of the nickel class, capable of acting as a hydrogenating catalyst chemically combined with an acid-forming element capable of readily uniting with nitrogen.

10. A process of affixing hydrogen to substances which comprises reacting upon a substance to which hydrogen is to be affixed, with hydrogen in the presence of a catalyst comprising a metal capable of acting as a hydrogenating catalyst and boron.

11. In the manufacture of ammonia, the improvement of effecting a reaction between hydrogen and nitrogen in the presence of a catalyst comprising a compound of a metal and an element of the boron group capable of combining with nitrogen.

12. The process which comprises bringing a mixture comprising nitrogen and hydrogen into contact with a catalyst containing both nickel and boron.

13. A process of effecting the combination of hydrogen and nitrogen which comprises bringing said gases into contact with a catalyst comprising a metal of the nickel class capable of acting as a hydrogenating catalyst chemically combined with a solid non-metal of the boron class capable of combining with nitrogen in a non-oxidized state, at a temperature at which said catalyst is active.

14. A process of effecting the combination of hydrogen and another substance which comprises bringing hydrogen and such other substance into contact with a catalyst comprising a metal of the nickel class capable of acting as a hydrogenating catalyst chemically combined with a nitrogen-occluding non-metal of the boron class, while in a non-oxidized state, at a temperature at which said catalyst is active.

15. A process which comprises reacting between nitrogen and hydrogen by bringing said nitrogen and hydrogen into contact with a catalyst comprising a compound consisting of nickel and boron.

16. A process which comprises bringing substances capable of reacting with each other, into contact with a catalyst comprising nickel and boron chemically combined with each other in a non-oxidized condition.

17. A process of effecting a chemical reaction which comprises reacting between substances in the presence of a catalyst comprising nickel chemically combined with a substantial proportion of boron.

18. A process as described of effecting a chemical reaction which comprises bringing the reacting substances together in the presence of nickel borid.

19. In the manufacture of ammonia, the improvement of effecting a reaction between hydrogen and nitrogen in the presence of a catalyst comprising a compound of a metal capable of serving as a hydrogenating catalyst chemically combined with a substantial proportion of boron.

20. The process which comprises bringing a mixture consisting essentially of nitrogen and hydrogen in combining proportions into contact with a catalyst comprising nickel chemically combined with a substantial proportion of an element of the boron group.

Signed at Montclair in the county of Essex and State of New Jersey this 24 day of June A. D. 1914.

CARLETON ELLIS.

Witnesses:
Joel Starrels,
Alfred A. Wells.